United States Patent
Kawabata et al.

(10) Patent No.: US 6,222,340 B1
(45) Date of Patent: Apr. 24, 2001

(54) STEPPING MOTOR CONTROL DEVICE AND OPTICAL HEAD DRIVE DEVICE

(75) Inventors: Toru Kawabata; Yoshihiro Mushika, both of Neyagawa; Masayoshi Shioya, Itami, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/381,483

(22) PCT Filed: Jan. 21, 1999

(86) PCT No.: PCT/JP99/00221
§ 371 Date: Dec. 10, 1999
§ 102(e) Date: Dec. 10, 1999

(87) PCT Pub. No.: WO99/38250
PCT Pub. Date: Jul. 29, 1999

(30) Foreign Application Priority Data

Jan. 23, 1998 (JP) .................................................. 10-011069

(51) Int. Cl.[7] ....................................................... H02P 8/22
(52) U.S. Cl. ............................................................ 318/685
(58) Field of Search .................................... 318/685, 696; 360/78.13

(56) References Cited

U.S. PATENT DOCUMENTS

| | | | |
|---|---|---|---|
| 4,761,598 | * 8/1988 | Lovrenich | 318/685 |
| 4,963,808 | 10/1990 | Torisawa et al. | 318/685 |
| 5,767,651 | * 6/1998 | Boillat et al. | 318/696 |
| 5,914,579 | * 6/1999 | Komm | 318/685 |
| 6,016,044 | * 1/2000 | Holdaway | 318/685 |
| 6,100,662 | * 8/2000 | Hansen | 318/685 |

FOREIGN PATENT DOCUMENTS

| | | |
|---|---|---|
| 313046A1 | 10/1988 | (EP) . |
| 574319 | 10/1993 | (JP) . |
| 10150798 | 6/1998 | (JP) . |
| 10304699 | 11/1998 | (JP) . |

* cited by examiner

Primary Examiner—Bentsu Ro
(74) Attorney, Agent, or Firm—Renner, Otto, Boisselle & Sklar

(57) ABSTRACT

According to a control device for a stepping motor of the present invention, in a first operation mode, a microstep driving section 16 is selected, and an output of this microstep driving section 16 is applied to a driving section 21 through a command selector 12, whereby a stepping motor 25 is microstep driven by this driving section 21. Furthermore, in a second operation mode, a forced driving section 15 is selected, and an output of this forced driving section 15 is applied to the driving section 21 through the command selector 12, whereby the stepping motor 25 is forced driven by this driving section 21, i.e., a high-speed rotation of a rotor 29 is started from any rotation angle with the microstep driving. Furthermore, in a third operation mode, a driving pattern generating section 13 is selected, an output of this driving pattern generating section 13 is applied to the driving section 21 through the command selector 12, whereby a high-speed rotation driving of the stepping motor 25 is continued by this driving section 21.

7 Claims, 9 Drawing Sheets

FIG.2

| | A-phase excited in positive direction | | A-phase excited in negative direction | |
|---|---|---|---|---|
| | Absolute value of current ratio B/A | Rotation angle Θ(°) | Absolute value of current ratio B/A | Rotation angle Θ(°) |
| B-phase excited in positive direction | 0 | 0 | 0 | 180 |
| | 0.051724138 | 5.625 | 0.051724138 | 174.375 |
| | 0.114285714 | 11.25 | 0.114285714 | 168.75 |
| | 0.204301075 | 16.875 | 0.204301075 | 163.125 |
| | 0.3 | 22.5 | 0.3 | 157.5 |
| | 0.411764706 | 28.125 | 0.411764706 | 151.875 |
| | 0.551724138 | 33.75 | 0.551724138 | 146.25 |
| | 0.75 | 39.375 | 0.75 | 140.625 |
| | 1 | 45 | 1 | 135 |
| | 1.333333333 | 50.625 | 1.333333333 | 129.375 |
| | 1.8125 | 56.25 | 1.8125 | 123.75 |
| | 2.428571429 | 61.875 | 2.428571429 | 118.125 |
| | 3.333333333 | 67.5 | 3.333333333 | 112.5 |
| | 4.894736842 | 73.125 | 4.894736842 | 106.875 |
| | 8.75 | 78.75 | 8.75 | 101.25 |
| | 19.33333333 | 84.375 | 19.33333333 | 95.625 |
| | A=0 | 90 | A=0 | 90 |
| B-phase excited in negative direction | 0 | 360 | 0 | 180 |
| | 0.051724138 | 354.375 | 0.051724138 | 185.625 |
| | 0.114285714 | 348.75 | 0.114285714 | 191.25 |
| | 0.204301075 | 343.125 | 0.204301075 | 196.875 |
| | 0.3 | 337.5 | 0.3 | 202.5 |
| | 0.411764706 | 331.875 | 0.411764706 | 208.125 |
| | 0.551724138 | 326.25 | 0.551724138 | 213.75 |
| | 0.75 | 320.625 | 0.75 | 219.375 |
| | 1 | 315 | 1 | 225 |
| | 1.333333333 | 309.375 | 1.333333333 | 230.625 |
| | 1.8125 | 303.75 | 1.8125 | 236.25 |
| | 2.428571429 | 298.125 | 2.428571429 | 241.875 |
| | 3.333333333 | 292.5 | 3.333333333 | 247.5 |
| | 4.894736842 | 286.875 | 4.894736842 | 253.125 |
| | 8.75 | 281.25 | 8.75 | 258.75 |
| | 19.33333333 | 275.625 | 19.33333333 | 264.375 |
| | A=0 | 270 | A=0 | 270 |

| Rotation angle | Rotation angle Θ of rotor | Command of forced driving |
|---|---|---|
| Clockwise | $0° \leq \Theta < 90°$ | Exciting A-phase in negative direction<br>Exciting B-phase in positive direction |
| | $90° \leq \Theta < 180°$ | Exciting A-phase in negative direction<br>Exciting B-phase in negative direction |
| | $180° \leq \Theta < 270°$ | Exciting A-phase in positive direction<br>Exciting B-phase in negative direction |
| | $270° \leq \Theta < 360°$ | Exciting A-phase in positive direction<br>Exciting B-phase in positive direction |
| Counterclockwise | $0° \leq \Theta < 90°$ | Exciting A-phase in negative direction<br>Exciting B-phase in negative direction |
| | $90° \leq \Theta < 180°$ | Exciting A-phase in positive direction<br>Exciting B-phase in negative direction |
| | $180° \leq \Theta < 270°$ | Exciting A-phase in positive direction<br>Exciting B-phase in positive direction |
| | $270° \leq \Theta < 360°$ | Exciting A-phase in negative direction<br>Exciting B-phase in positive direction |

FIG. 4

| Rotation angle | Rotation angle Θ | Encoder pulse discrete value when switching |
|---|---|---|
| Clockwise | $0° + n \times 90° \leq \Theta < 22.5° + n \times 90°$<br>n=integer within 0~3 | 4 |
| | $22.5° + n \times 90° \leq \Theta < 45° + n \times 90°$<br>n=integer within 0~3 | 3 |
| | $45° + n \times 90° \leq \Theta < 67.5° + n \times 90°$<br>n=integer within 0~3 | 2 |
| | $67.5° + n \times 90° \leq \Theta < 90° + n \times 90°$<br>n=integer within 0~3 | 1 |
| Counterclockwise | $0° + n \times 90° \leq \Theta < 22.5° + n \times 90°$<br>n=integer within 0~3 | 1 |
| | $22.5° + n \times 90° \leq \Theta < 45° + n \times 90°$<br>n=integer within 0~3 | 2 |
| | $45° + n \times 90° \leq \Theta < 67.5° + n \times 90°$<br>n=integer within 0~3 | 3 |
| | $67.5° + n \times 90° \leq \Theta < 90° + n \times 90°$<br>n=integer within 0~3 | 4 |

FIG. 5

| Rotation angle | Rotation angle Θ of rotor | The number of pulse from binary circuit 34 and driving pattern after switching |
|---|---|---|
| Clockwise | 0° ≤ Θ < 90° | Just after switching : Exciting A-phase negative, B-phase negative<br>3rd count : Exciting A-phase positive, B-phase negative<br>7th count : Exciting A-phase positive, B-phase positive<br>11th count : Exciting A-phase negative, B-phase positive<br>15th count : Exciting A-phase negative, B-phase negative<br>(Thereafter phases are switched likewise every 4 counts) |
| | 90° ≤ Θ < 180° | Just after switching : Exciting A-phase positive, B-phase negative<br>3rd count : Exciting A-phase positive, B-phase positive<br>7th count : Exciting A-phase negative, B-phase positive<br>11th count : Exciting A-phase negative, B-phase negative<br>15th count : Exciting A-phase positive, B-phase negative<br>(Thereafter phases are switched likewise every 4 counts) |
| | 180° ≤ Θ < 270° | Just after switching : Exciting A-phase positive, B-phase positive<br>3rd count : Exciting A-phase negative, B-phase positive<br>7th count : Exciting A-phase negative, B-phase negative<br>11th count : Exciting A-phase positive, B-phase negative<br>15th count : Exciting A-phase positive, B-phase positive<br>(Thereafter phases are switched likewise every 4 counts) |
| | 270° ≤ Θ < 360° | Just after switching : Exciting A-phase negative, B-phase positive<br>3rd count : Exciting A-phase negative, B-phase negative<br>7th count : Exciting A-phase positive, B-phase negative<br>11th count : Exciting A-phase positive, B-phase positive<br>15th count : Exciting A-phase negative, B-phase positive<br>(Thereafter phases are switched likewise every 4 counts) |
| Counterclockwise | 0° ≤ Θ < 90° | Just after switching : Exciting A-phase negative, B-phase negative<br>3rd count : Exciting A-phase negative, B-phase positive<br>7th count : Exciting A-phase positive, B-phase positive<br>11th count : Exciting A-phase positive, B-phase negative<br>15th count : Exciting A-phase negative, B-phase negative<br>(Thereafter phases are switched likewise every 4 counts) |
| | 90° ≤ Θ < 180° | Just after switching : Exciting A-phase positive, B-phase negative<br>3rd count : Exciting A-phase negative, B-phase negative<br>7th count : Exciting A-phase negative, B-phase positive<br>11th count : Exciting A-phase positive, B-phase positive<br>15th count : Exciting A-phase positive, B-phase negative<br>(Thereafter phases are switched likewise every 4 counts) |
| | 180° ≤ Θ < 270° | Just after switching : Exciting A-phase positive, B-phase positive<br>3rd count : Exciting A-phase positive, B-phase negative<br>7th count : Exciting A-phase negative, B-phase negative<br>11th count : Exciting A-phase negative, B-phase positive<br>15th count : Exciting A-phase positive, B-phase positive<br>(Thereafter phases are switched likewise every 4 counts) |
| | 270° ≤ Θ < 360° | Just after switching : Exciting A-phase negative, B-phase positive<br>3rd count : Exciting A-phase positive, B-phase positive<br>7th count : Exciting A-phase positive, B-phase negative<br>11th count : Exciting A-phase negative, B-phase negative<br>15th count : Exciting A-phase negative, B-phase positive<br>(Thereafter phases are switched likewise every 4 counts) |

*FIG. 8* PRIOR ART

| Input value | Output value | | | |
|---|---|---|---|---|
| | P | Q | Inverse of P | Inverse of Q |
| 0 | 0 | 0 | 1 | 1 |
| 1 | 0 | 0 | 1 | 1 |
| 2 | 1 | 0 | 0 | 1 |
| 3 | 1 | 0 | 0 | 1 |
| 4 | 1 | 0 | 0 | 1 |
| 5 | 1 | 0 | 0 | 1 |
| 6 | 1 | 1 | 0 | 0 |
| 7 | 1 | 1 | 0 | 0 |
| 8 | 1 | 1 | 0 | 0 |
| 9 | 1 | 1 | 0 | 0 |
| 10 | 0 | 1 | 1 | 0 |
| 11 | 0 | 1 | 1 | 0 |
| 12 | 0 | 1 | 1 | 0 |
| 13 | 0 | 1 | 1 | 0 |
| 14 | 0 | 0 | 1 | 1 |
| 15 | 0 | 0 | 1 | 1 |

FIG. 9 PRIOR ART

| Select signal | | Correspondence | |
|---|---|---|---|
| CW | CM | Output A | Output B |
| 1 | 1 | P | Q |
| 1 | 2 | Q | Inverse of P |
| 1 | 3 | Inverse of P | Inverse of Q |
| 1 | 4 | Inverse of Q | P |
| 0 | 1 | Q | P |
| 0 | 2 | P | Inverse of Q |
| 0 | 3 | Inverse of Q | Inverse of P |
| 0 | 4 | Inverse of P | Q | ern angle of 18°. The stepping motor 125 includes a rotor 129 made of a permanent magnet, in which N-poles and S-poles are polarised at every angle of 72° and five poles are polarised for the N-pole and the S-pole in one round, and a two-phase excitation coil including the A-phase stator 126 and the B-phase stator 127. The A-phase stator 126 and the B-phase stator 127 include yokes in which N-poles and S-poles are polarised at every angle of 72° and five poles are polarised for the N-pole and the S-pole in one round, and these yokes are positioned around the rotor 129. The magnetic poles of the yoke of the A-phase stator 126 and the magnetic poles of the yoke of the B-phase stator 127 are offset with respect to each other by 18°.

STEPPING MOTOR CONTROL DEVICE AND OPTICAL HEAD DRIVE DEVICE

TECHNICAL FIELD

The present invention relates to a control device for a stepping motor, and a driving device for an optical head employing the control device for the stepping motor.

BACKGROUND ART

A stepping motor has characteristics of being small, and having high torque and long life-time. A driving method by an open-loop control utilizing simple controllability of the stepping motor is generally employed therefor. However, in the driving by the open-loop control, there are some problems such as a loss of synchronism wherein a rotation angle of the motor departs from the target, a vibration of the motor, a difficulty in achieving a high-speed rotation, etc. On the other hand, in a driving method by a closed-loop control, an encoder is provided to the stepping motor, and the motor is controlled while detecting the rotation angle of the motor by the encoder, whereby the loss of synchronism and the vibration are suppressed and the high-speed rotation potential improves, though a control system therefor becomes complex.

U.S. Pat. No. 4,963,808 describe a configuration capable of utilizing a two-phase stepping motor in the two types of operation modes while switching the open-loop control with the two-phase stepping motor and the closed-loop control employing the two-phase stepping motor as a DC motor. In addition, also described herein is a technique in which the number of output pulses in one cycle of the encoder for detecting the rotation angle of the stepping motor is set to be a multiple of the number of magnetic poles in the rotor of the stepping motor. The stepping motor is one-phase excited so as to start the rotation of the rotor from the state in which the rotor is at rest in a predetermined position. An exciting current of the stepping motor is switched every time a predetermined number of pulses are output from the encoder in response to this rotation, thereby suppressing a phase difference between the output pulse and the exciting current of the stepping motor to a predetermined error or less without adjustment.

FIG. 7 shows the conventional device for closed-loop controlling the stepping motor.

In FIG. 7, a control section 124 drives and controls a stepping motor 125 according to either of a first operation mode and a second operation mode. In the first operation mode, the microstep driving, for controlling the rotation angle of a rotor 129 of the stepping motor 125 by the closed-loop control, in which a current command is output from the control section 124 to a driving section 121, is conducted at a timing at which the current command is generated by the control section 124. Furthermore, in the second operation mode, the rotor 129 of the stepping motor 125 is rotated at a high speed by a closed-loop control in which the rotation angle of the rotor 129 is detected by an encoder 128, the detected rotation angle is provided to the control section 124, and a current command is output from the control section 124 to the driving section 121.

The driving section 121 includes an A-phase current driver 122 and a B-phase current driver 123, which are independent from each other. The A-phase current driver 122 and the B-phase current driver 123 are provided with an A-phase current command and a B-phase current command from the control section 124 through a data selector 137 to form currents of the current commands, respectively, and provide these currents to an A-phase stator 126 and a B-phase stator 127, thereby driving the stepping motor 125. Specifically, the A-phase current driver 122 and the Bphase current driver 123 include a D/A converter for converting digital data representing the A-phase current command and the B-phase current command to analog signals, and an amplifier for amplifying and outputting the analog signal.

The stepping motor 125 is of a two-phase PM type, and a stepping angle by the two-phase excitation is 18°. The stepping motor 125 includes a rotor 129 made of a permanent magnet, in which N-poles and S-poles are polarised at every angle of 72° and five poles are polarised for the N-pole and the S-pole in one round, and a two-phase excitation coil including the A-phase stator 126 and the B-phase stator 127. The A-phase stator 126 and the B-phase stator 127 include yokes in which N-poles and S-poles are polarised at every angle of 72° and five poles are polarised for the N-pole and the S-pole in one round, and these yokes are positioned around the rotor 129. The magnetic poles of the yoke of the A-phase stator 126 and the magnetic poles of the yoke of the B-phase stator 127 are offset with respect to each other by 18°.

A slit disc 131, in which slits are formed at every angle of 4.5°, is fixed to a rotor axis 130. A pitch of an angle of 4.5°, at which each slit of the slit disc 131 is formed, is determined such that it becomes 1/integer of a pitch of an angle of 72° at which each magnetic pole of the rotor 129 is formed (herein, $\frac{1}{16}$). Especially, since the number of phases of the stepping motor 125 is two phases, the pitch of the angle of 4.5° at which each slit is formed is determined so as to satisfy a relationship of 1/(a multiple of 2), i.e., $\frac{1}{16}=1/(2\times8)$.

A photosensor 132 includes an LED of light emission side and a phototransistor of light reception side, and is of a transparent type in which the LED and the phototransistor are placed on both sides of the slit disc 131. The phototransistor detects the slit of the slit disc 131 by receiving light output from the LED with the phototransistor through the slit of the slit disc 131. The phototransistor outputs an output signal according to the presence and absence of the slit of the slit disc 131. The photosensor 132 is contained in the housing 133 with the slit disc 131, thereby being protected from stain and damage caused by breakage and/or dust.

An output of the photosensor 132 is binarized by a comparator 134. The comparator 134 not only simply compares the output of the photosensor 132 with a reference value so as to output signals of a high level and of a low level, but also switches the high level and the low level of the output signal only when the output of the photosensor 132 is changed between two reference values, thereby avoiding a malfunction due to chattering.

A pulse signal output from the comparator 134 is input to a control section 124 and a hexadecimal counter 135.

A counter 135 counts up in the range of an enumerated value 0–15 every time a single pulse signal is input from the comparator 134; and after the enumerated value reaches 15, the counter 135 initializes the enumerated value to be 0 at a timing of the next count-up, and outputs the enumerated value circulating in the range from 0 to 15 as a binary number of 4 bits. Furthermore, when the clear signal is input from the control section 124, the counter 135 initializes the enumerated value thereof to be 0.

A 4 input/4 output code converter 136 is provided with an enumerated value of four bits from the counter 135, converts the enumerated value to a code of four bits, and outputs this code. The relationship between these enumerated values and the code is shown in a code table 81 of FIG. 8. Herein, 4 bits representing codes output from the code converter 136 are referred to as a P bit, a Q bit, a P inverted bit, and a Q inverted bit. A discrete value input to the code converter 136 is represented not by an actual binary number of 4 bits but by a decimal number.

As seen from the code table 81, each of bits representing codes output from the code converter 136 is one that is obtained by dividing cycles of a pulse signal output from the comparator 134 so as to be ¹⁄₁₆. Phases of the P bit and the Q bit from the code converter 136 are offset with respect to each other by four cycles of a pulse signal output from the comparator 134. Likewise, phases of other P invert bit and Q invert bit from the code converter 136 are offset with respect to each other by four cycles of the pulse signal output from the comparator 134.

A data selector 137 inputs a select signal of 3 bits from the control section 124 as well as four bits, i.e., a P bit, a Q bit, a P inverted bit, and a Q inverted bit, selects two among the P bit, the Q bit, the P inverted bit, and the Q inverted bit according to this select signal, and outputs these selected bits as an A-phase current command and a B-phase current command. These A-phase and B-phase current commands are applied to the driving section 121, and currents of the current commands are applied to the A-phase stator 126 and the B-phase stator 127, thereby rotating the rotor 129.

Details of three bits representing the select signal are a rotation direction data CW (1 bit) and a motor initial state data CM (2 bits).

The rotation direction data CW represents "1" when the stepping motor 125 is rotated in a clockwise direction, and "0" when it is rotated in a counterclockwise direction.

The motor initial state data CM represents an excitation state of the A-phase stator 126 and the B-phase stator 127 of the stepping motor 125 at a point in time when a first operation mode ends. After the stepping motor 125 is once set at a one-phase excitation state by the microstep driving in the first operation mode, the control of driving in a second operation mode is conducted. The one-phase excitation state in the first operation mode includes four states, i.e., a state that only the A-phase stator 126 is excited in the positive direction, a state that only the B-phase stator 127 is excited in the positive direction, a state that only the A-phase stator 126 is excited in the negative direction, and a state that only the B-phase stator 127 is excited in the negative direction. The motor initial state data CM is provided with either of "1", "2", "3", and "4" in the above order according to the state from which a switching to the second operation mode is conducted.

A correspondence between the motor initial state data CM and the rotation direction data CW and two bits selected by and output from the data selector 137 is shown in table 82 of FIG. 9. In this table 82, the motor initial state data CM is represented not by an actual binary number of 4 bits but by a decimal number.

Next, an operation of a stepping motor having such a structure will be described.

First, the control section 124 determines a rotation direction of the rotor 129 of the stepping motor 125. For example, the rotation direction is set to be a clockwise direction. Then, the one-phase excitation state is set up by the microstep driving in the first operation mode to rotate the rotor 129 of the stepping motor 125 to a position of said state.

The one-phase excitation state includes four types of states, as described above. However, a position of the rotor 129 also includes four positions, typically, it is a position at which the rotor 129 reaches in the first place when the rotor 129 is rotated from a rest position in the determined rotation direction. Herein, it is a position of the state in which only the A-phase stator 126 is excited in the positive direction.

After this one-phase excitation state is maintained for 1–2 ms, the control section 124 outputs a clear signal to the counter 135 so that an enumerated value becomes 0. In addition, the control section 124 outputs the motor initial state data CM and the rotation direction data CW to data selector 137.

Herein, "1" is set at the motor initial state data CM so that the rotation direction is clockwise, and "1" is set at the rotation direction data CW in order to start driving from the state that only the A-phase stator 126 is excited in the positive direction. These data values are continuously maintained until the rotor 129 shifts from a first operation mode to a second operation mode, i.e., from a high-speed operation state to a rotation angle controlling state.

When "1" is set at the motor initial state data CM, and "1" is set at the rotation direction data CW, an A-phase current command and a B-phase current command output from the data selector 137 are the P-bit and the Q-bit, as seen from the table 82. And, at a point in time when the enumerated value of the counter 135 is cleared, both the A-phase current command and the B-phase current command (the P-bit and the Q-bit) becomes "0" (low level), as shown in the code table 81. At this time, the operation mode state becomes the second operation mode state, and respective currents of the A-phase current command and the B-phase current command are provided from the driving section 121 to the A-phase stator 126 and the B-phase stator 127, whereby the rotor 129 rotates in the clockwise direction from a rest position of the one-phase excitation state.

After the rotation of the rotor 129 starts in the second operation mode, a pulse signal is output from the binary counter 134 every time the rotor 129 rotates by an angle of 4.5°. When a pulse signal of second cycle is output, the enumerated value of the counter 135 becomes "2", and the A-phase current command becomes "1" (High). Thereafter, the A-phase current command changes every eight cycles of a pulse signal output from the binary counter 134. Likewise, a pulse signal of the sixth cycle of the binary counter 134 is output, the enumerated value of the counter 135 becomes "6", and the B-phase current command becomes "1". Thereafter, B-phase current command changes every eight cycles of a pulse signal output from the binary counter 134.

That is, the A-phase current command and the B-phase current command are selected among the P bit, the Q bit, the P inverted bit, the Q inverted bit according to a rotation direction and a rest position of the one-phase excitation state, and updated every eight cycles of a pulse signal output from the binary counter 134 in response to the rotation of the rotor 129 while maintaining a phase difference of four cycles of a pulse signal output from the binary counter 134.

Respective currents of the A-phase current command and the B-phase current command are continuously provided to the A-phase stator 126 and the B-phase stator 127, whereby the rotor 129 continues to rotate in the clockwise direction. The A-phase stator 126 is excited in the positive direction or in the negative direction in response to the A-phase current command "1" or "0", and the B-phase stator 127 is excited in the positive direction or in the negative direction in response to the B-phase current command "1" or "0". Thus, the A-phase stator 126 and the B-phase stator 127 are excited while consistently maintaining a certain relationship with the angle position of the rotor, respectively, and rotated without causing a loss of synchronism due to an abrupt increase of the load or the like.

The rotor 129 is sometimes controlled at any rotation angle by the microstep driving as well as at the four rotation angles by the above-described four one-phase excitation states. That is, the rotor 129 is sometimes rested at any other rotation angle by appropriately adjusting each of the currents of the A-phase stator 126 and the B-phase stator 127 in a well-known manner.

In the conventional apparatus, when the rotor 129 is rotated from a state that the rotor 129 is rested at any rotation angle, it is required to shift to the second operation mode through the first operation mode. Therefore, since the rotor 129 is rotated from any rotation angle to a rotation angle of the one-phase excitation mode by the microstep driving at a point in time when the first operation mode starts, this rotation requires some extra time.

Furthermore, the one-phase excitation state of the rotor 129 has to be maintained for a certain period until the rotation angle of the rotor 129 becomes stable. This is because a magnetic power between the rotor 129 and each of the stators 126 and 127 functions as a kind of spring power, this spring power and a mass of the rotor 129 form a kind of oscillatory system, and a vibration occurs in the rotor 129 when the rotating rotor 129 stops at any rotation angle. The operation is on standby for a certain period until this vibration decreases and the rotation angle of the rotor 129 becomes stable. Since the rotor 129 reciprocatingly rotates in the clockwise direction and the counterclockwise direction while the rotor 129 is vibrating, even when an output of the encoder 128 is counted by the counter 135 to detect the rotation angle of the rotor 129, this detected rotation angle includes a large error with respect to an actual rotation angle of the rotor 129. Therefore, it is necessary to wait for the output of the clear signal for initializing the enumerated value of the counter 135 until the damped vibration is completely calmed down. This time period is about 10–20 ms, which is not a negligible length of time in some applications to which the stepping motor 125 is directed. For example, when the stepping motor 125 is applied to a typical CD-ROM apparatus or the like, and an optical head is moved along a radial direction of a disk by the stepping motor 125, a standby period of 10–20 ms occurs, which is very long.

Furthermore, when the stepping motor 125 is applied to an optical disk apparatus or the like, and a focus of an optical head is controlled by the stepping motor 125, the damped vibration of the rotor 129 travels to the optical head, thereby adversely affecting a radial position servo of the optical head.

Thus, the present invention is provided in view of the above conventional problems, and an object thereof is to provide a control device for a stepping motor capable of rotating a rotor from any rotation angle within a very short time period without a vibration of the rotor, and a driving device for an optical head employing a control apparatus for the stepping motor.

DISCLOSURE OF INVENTION

In order to solve the above conventional problems, a control device for a stepping motor of the present invention includes a stepping motor including a rotor in which a magnetic pole is formed for a certain angle along a circumferential direction, and an exciting coil of multiple phases, rotation angle detection means for detecting a rotation angle of the rotor, driving current setting means for setting each driving current of the exciting coil according to each rotation angle of the rotor; and, control means for obtaining a driving current of the exciting coil corresponding to the rotation angle of the rotor detected by the rotation angle detection means by the driving current setting means in a microstep driving state for controlling the rotation angle of the rotor, and applying the driving current to the exciting coil, thereby shifting the rotor to a rotation driving state of the rotor.

In one embodiment, the driving current setting means has a first data table in which each driving current of the exciting coil is stored according to each rotation angle of the rotor in the microstep driving state, and a second data table in which each driving current of the exciting coil is stored according to each rotation angle of the rotor in the rotation driving state, and the control means obtains a driving current corresponding to the rotation angle of the rotor detected by the rotation angle detection means in the microstep driving state from the first data table and applies the driving current to the exciting coil, thereby starting a driving of the rotation of the rotor, and thereafter, the control means obtains a driving current corresponding to the rotation angle of the rotor, which is to be applied to the exciting coil and has been detected by the rotation angle detection means, from the second data table and applies the driving current to the exciting coil, thereby continuing the rotation.

In one embodiment, the rotation angle detection means includes a first rotation angle detection means for detecting the rotation angle of the rotor according to the driving current of the exciting coil, and a second rotation angle detection means composed of an encoder connected to the rotor, the rotation angle of the rotor detected by the first rotation angle detection means is used for obtaining a driving current of the exciting coil from the first data table, and the rotation angle of the rotor detected by the second rotation angle detection means is used for obtaining a driving current of the exciting coil from the second data table.

In one embodiment, the control means sets the rotation angle of the rotor from a rotation start point in time of the rotor at which the driving current obtained from the first data table is applied to the exciting coil to a point in time at which the driving current obtained from the second data table starts to be applied to the exciting coil, and the set rotation angle of the rotor is detected by the second rotation angle detection means.

In one embodiment, the first rotation angle detection means has a rotation angle data table in which the rotation angle of the rotor corresponding to the driving current of the exciting coil is stored.

Furthermore, a control device for a stepping motor of the present invention includes a stepping motor including a rotor in which a magnetic pole is formed for a certain angle along circumferential direction, and an exciting coil of multiple phases, rotation angle detection means for outputting a periodic signal every time the rotor rotates by a predetermined angle, driving current setting means for setting each driving current of the exciting coil for each divided frequency, control means for dividing the periodic signal from the rotation angle detection means to obtain a divided frequency, the driving current is obtained from the second data table at every divided frequency, and applying the driving current to the exciting coil so as to drive and rotate the rotor, whereby a dividing ratio of the periodic signal is changed according to a rotation speed of the rotor.

Furthermore, a driving device for an optical head of the present invention, which drives an optical head for recording in or reproducing from a recording medium by a stepping motor including a rotor in which magnetic poles are formed for a certain angle along circumferential direction, and an exciting coil of multiple phases, the driving device includes a control device for driving and controlling the stepping motor, wherein the control device includes rotation angle detecting means for detecting a rotation angle of the rotor, driving current setting means for setting each driving current of the excitation coil according to each of the rotation angles of the rotor, control means for obtaining the driving current of the excitation coil corresponding to the rotation angle of the rotor detected by the rotation angle detecting means in a microstep driving state in which the rotation angle of the rotor is controlled by the driving current setting means, and applying the driving current to the excitation coil, thereby shifting the rotor to a rotation driving state of the rotor.

BRIEF DESCRIPTION OF DRAWINGS

FIG. 2 is a diagram showing a rotation angle data table in which rotation angles of the rotor corresponding to A-phase current and B-phase current in the control device of the stepping motor of FIG. 1 are stored.

FIG. 3 is a diagram showing a first data table in which A-phase current and B-phase current at a point in time when rotation of the rotor begins in the control device of the stepping motor of FIG. 1 are stored.

FIG. 4 is a diagram showing a switch timing data table in which timings to switch from a second operation mode to a third operation mode in the control device of the stepping motor of FIG. 1 are stored.

FIG. 5 is a diagram showing a second data table in which A-phase current and B-phase current when the rotor is rotating in the control device of the stepping motor of FIG. 1 are stored.

FIG. 8 is diagram showing a code table in a control device of the stepping motor of FIG. 7.

FIG. 9 is diagram showing a data table in a control device of the stepping motor of FIG. 7.

BEST MODE FOR CARRYING OUT THE INVENTION

Hereinafter, one embodiment of the present invention will be described with reference to the attached drawings.

Figure 1:
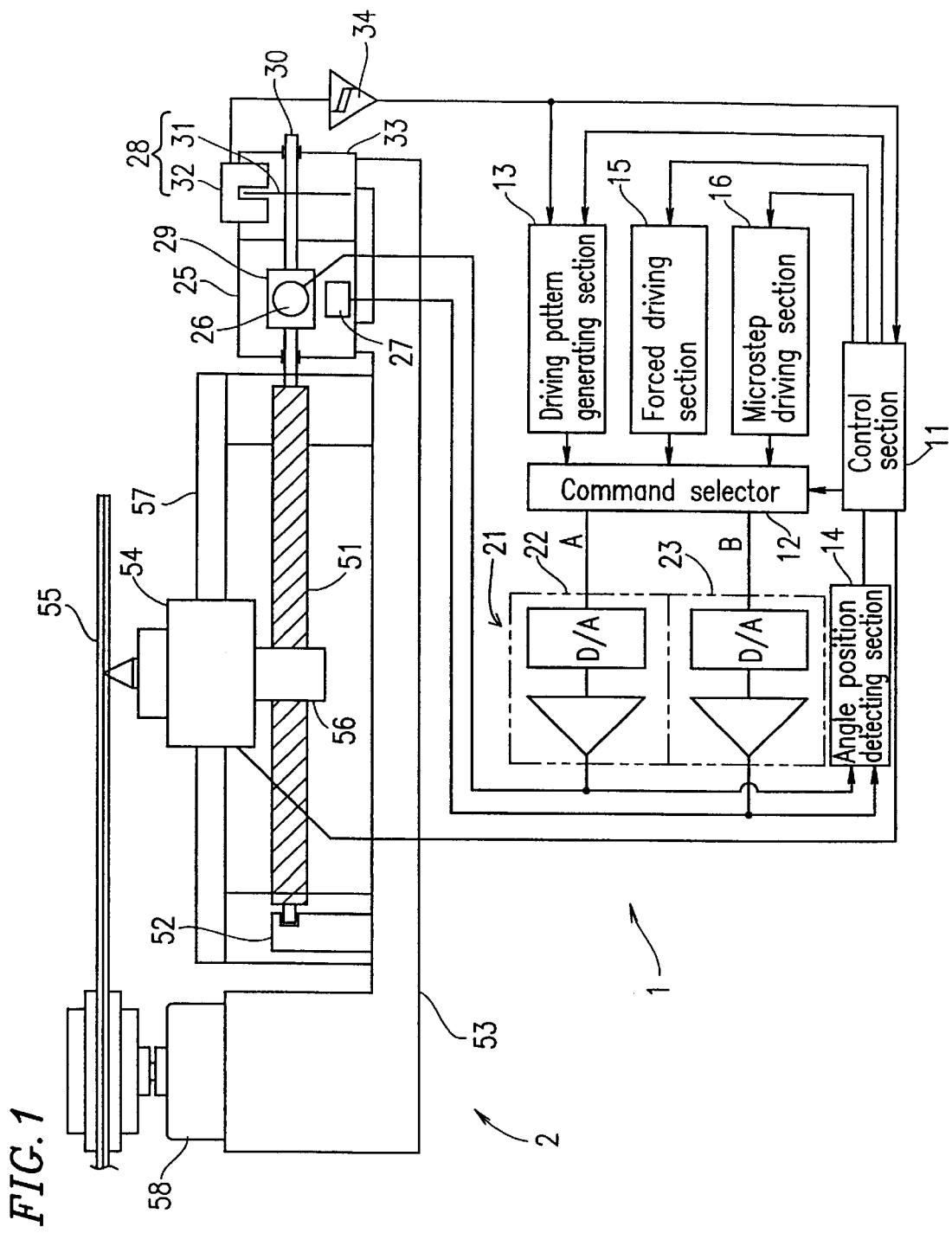
FIG. 1 is a block diagram showing one example of a control device of a stepping motor and a driving device for an optical head according to the present invention.

FIG. 1 is a block diagram showing one example of a control device of a stepping motor and a driving device for an optical head according to the present invention. In the present embodiment, an optical head 54 of a driving device 2 for an optical head is transported by a stepping motor 25 of the control device of the stepping motor.

In the driving device 2 of the optical head, a lead screw 51 is connected to a rotor axis 30 of the stepping motor 25 and rotatably supported by a bearing 52, which is fixed to a chassis 53, or the like. A pitch of the grooves of the lead screw 51 is, for example, 3 mm. The optical head 54 includes a laser diode, a photodetector, a lens, a lens actuator, and the like for irradiating an optical disk 55 with a laser beam, thereby optically recording information in the optical disk 55 and reading information from the optical disk 55. A guide shaft 57 penetrates the optical head 54 and a nut-piece 56 is fixed to the optical head 54. The nut-piece 56 is associated with the lead screw 51 and urged with respect to the lead screw 51 toward either of a right side or a left side of the drawing, thereby eliminating the play of the screw. When the lead screw 51 is rotated by the stepping motor 25, the optical head 54 reciprocates linearly in response to this rotation. The optical disk 55 is rotated by a spindle motor 58.

When information is recorded in or read from the optical disk 55, the optical head 54 traces a track of the optical disk 55. A pitch between adjacent tracks of the optical disk 55 is very small, e.g., about 1 μm. Thus, in order to allow an irradiation spot of a laser beam from the optical head 54 to correctly follow the tracks, a tracking actuator for finely adjusting the position of the laser beam is mounted on the optical head 54.

Furthermore, a range in which the irradiation spot of the laser beam can be transported by the tracking actuator is small. For example, in a recording/reproducing device for a rewritable optical disk, the range in which it can be transported is about ±50 μm. Because of this, by rotating the stepping motor 25 to finely adjust a position of the optical head 54, a target track is captured within the range in which the irradiation spot of the laser beam can be transported by the tracking actuator.

The stepping motor 25 used herein is of two-phase PM type, and a step angle thereof by two-phase excitation is 18°. When the stepping motor 25 is driven by two-phase excitation, the lead screw 51 connected to the rotor axis 30 is rotated by a step angle of 18° for each rotation. Furthermore, a pitch of the grooves of the lead screw 51 is 3 mm. In this case, the lead screw 51 is rotated by two-phase excitation by a step angle of 18°, the optical head 54 moves 150 μm. Therefore, as long as the stepping motor 25 is driven by two-phase excitation, the optical head 54 moves by 150 μm for each movement. Thus, the target track may not necessarily be in a range of ±50 μm in which the irradiation spot of the laser beam can be transported by the tracking actuator.

So, a rotation angle of a rotor 29 of the stepping motor 25 is finely adjusted to be less than 18° by microstep driving the stepping motor 25, thereby moving the optical head 54 little by little so that the target track is in the range of ±50 μm in which the irradiation spot of the laser beam can be transported.

In the case where the microstep driving is employed, in which a stepping angle of 18° is divided into sixteen equal segments, when the lead screw 51 connected to the rotor axis 30 is rotated by one microstep (1.125°), the optical head 54 moves by 9.375 μm, whereby the target track is in the range of ±50 μm.

As described above, the driving device 2 for the optical head not only rotate the rotor 29 by two-phase excitation by a stepping angle of 18° but may also rotate the rotor 29 by microstep driving by a smaller angle, in order to keep the target track in the range of ±50 μm in which the irradiation spot of the laser beam can be transported.

Moving the optical head 54 from a track, which is presently being scanned, to another track is referred to as seeking. When seeking is conducted, an address of a position which is presently being accessed in the optical disk 55 is read by the optical head 54, and direction and distance of movement is obtained from the address of the present position and an address of a target position, thereby determining how to move the optical head 54.

For example, when a distance of movement is very short, within which there are only several tracks, the optical head 54 is transported only by the tracking actuator without rotating the rotor 29 of the stepping motor 25.

When a distance of movement is about 1 mm, the rotor 29 of the stepping motor 25 is rotated little by little by the microstep driving, thereby transporting the irradiation spot of the laser beam from the optical head 54 to the vicinity of the target track.

Furthermore, when a distance of movement is long, the rotor 29 of the stepping motor 25 is rotated at a high speed, thereby quickly transporting the optical head 54.

In the present embodiment, even in the case where the rotor 29 of the stepping motor 25 is at any rotation angle by microstep driving as will be described later, the rotor 29 can be quickly rotated in a high speed. Therefore, no time lag occurs when the rotor shifts from microstep driving to a high speed rotation. On the other hand, in the previously described conventional device, the rotor 129 is rotated from any rotation angle to a rotation angle in a one-phase excitation state, and on stand-by until a rotation angle of the rotor 129 becomes stable; thereafter, the rotor 129 is driven at a high speed. Thus, a significantly large time lag occurs while the driving shifts from microstep driving to high speed rotation driving.

In the driving device 2 for the optical head according to the present embodiment, a first operation mode, a second operation mode, and a third operation mode are sequentially set, and the stepping motor 25 is driven and controlled according to these operation modes. In the first operation mode, a microstep driving section 16 is selected, and an output from the microstep driving section 16 is applied to a driving section 21 through a command selector 12, whereby the stepping motor 25 is microstep driven by the driving section 21. In the second operation mode, a forced driving section 15 is selected, and an output from the forced driving section 15 is applied to the driving section 21 through the command selector 12, whereby the driving section 21 forcedly drives the stepping motor 25, i.e., a high-speed rotation of the rotor 29 is started at any rotation angle of the microstep driving. Furthermore, in the third operation mode, a driving pattern generating section 13 is selected, and an output from the driving pattern generating section 13 is applied to the driving section 21 through the command selector 12, whereby the driving section 21 continues the high-speed rotation of the stepping motor 25.

The driving section 21 includes an A-phase current driver 22 and a B-phase current driver 23, which are independent from each other. The A-phase current driver 22 and the B-phase current driver 23 are provided with an A-phase current command and a B-phase current command through the command selector 12, to form currents for the current commands, respectively. These currents are provided to an A-phase stator 26 and a B-phase stator 27, thereby driving the stepping motor 25. Specifically, the A-phase current driver 22 and the B-phase current driver 23 include D/A converters for converting digital data, which represent the A-phase current command and the B-phase current command, to analog signals, respectively, and an amplifier for amplifying and outputting each of the analog signals.

The stepping motor 25 is of two-phase PM type, and a stepping angle by the two-phase excitation is 18°. The stepping motor 25 includes a rotor 29 made of a permanent magnet, in which N-poles and S-poles are polarised at every angle of 72° and five poles are polarised for the N-pole and the S-pole in one round, and a two-phase excitation coil including the A-phase stator 26 and the B-phase stator 27. The A-phase stator 26 and the B-phase stator 27 include yokes, in which N-poles and S-poles are polarised at every angle of 72° and five poles are formed for the N-pole and the S-pole in one round, respectively, and these yokes are arranged around the rotor 29. Each magnetic pole of the A-phase stator 26 and each magnetic pole of the B-phase stator 27 are offset by 18° with respect to each other.

A slit disc 31, in which slits are formed every angle of 4.5° (22.5° in an electric angle, which will be described later), is fixed to a rotor axis 30. A pitch of angle of 4.5°, at which slits of the slit disc 31 are formed, is set to be 1/(integer) of a pitch of angle of 72° (an electric angle of 360°), at which each of the magnetic poles are formed (herein, $\frac{1}{16}$). Especially, since the number of phases of the stepping motor 25 is two phases, a pitch of an angle of 4.5°, at which each slit is formed, is determined such that 1/(a multiple of 2), i.e., a relation, $\frac{1}{16} = 1/(2 \times 8)$, is satisfied.

A photosensor 32 includes an LED at a light emission side and a phototransistor at a light reception side and is of a transparent type in which the LED and the phototransistor are positioned on the both side of the slit disc 31. The phototransistor receives light output from the LED through the slits of the slit disc 31, thereby detecting the slits of the slit disc 31. The phototransistor outputs an output signal in response to the presence and absence of a slit of the slit disc 31. The photosensor 32 is contained together with the slit disc 31 in a housing 33, thereby being protected from stain and damage caused by breakage and/or dust.

An output from the photosensor 32 is binarized by a comparator 34. The comparator 34 not only simply compares the output of the photosensor 32 with a reference value so as to output signals of a high level and a low level, but also switches the high level and the low level of the output signal only when the output of the photosensor 32 is changed between two reference values, thereby avoiding a malfunction due to chattering.

A pulse signal output from the comparator 34 is input to a control section 11 and a driving pattern generating section 13.

The microstep driving section 16 is to conduct the microstep driving in the first operation mode which has been previously described, in which the A-phase current command and the B-phase current command are changed with respect to the A-phase current driver 22 and the B-phase current driver 23 in response to a target rotation angle provided from the control section 11. Also, a ratio between currents flowing into the A-phase stator 26 and the B-phase stator 27 is changed, thereby rotating the rotor 29 to set at the target rotation angle. The target rotation angle is controlled by high resolution.

The relationship between the rotation angle of the rotor 29 and the current ratio depends on a magnetic circuit and the state of loading of the stepping motor 25. The A-phase current command and the B-phase current command for positioning the rotor 29 at each of the evenly spaced rotation angles are obtained. A data table is prepared in advance, in which the A-phase current command and the B-phase current command are recorded so as to correspond to each of the rotation angles. An A-phase current command and a B-phase current command corresponding to a certain rotation angle are read from the data table. Alternatively, a function for obtaining the A-phase current command and the B-phase current command corresponding to the rotation angle is prepared in advance, and an A-phase current command and a B-phase current command corresponding to a certain rotation angle are drawn according to the function. For example, when a stepping angle of 18° (an electric angle of 90°) by two-phase excitation is divided into sixteen equal angles, and the rotor 29 is rotated by a microstep which is a rotation angle of 1.125° (an electric angle of 5.625°), the data table is arranged such that the A-phase current command and the B-phase current command are generated for 16 levels (4 bits) of microstep commands, and then, 8 bits representing the A-phase current command and the B-phase current command are incremented or decremented, thereby rotating and controlling the stepping motor 25 in a certain rotation angle.

Such a microstep driving is conducted according to a well-known technique.

When an electric angle is represented as $\theta$, and an actual angle of the rotor 29 is represented as $\theta_0$, the relationship between the electric angle $\theta$ and the actual angle $\theta_0$ is represented by the following expression (1):

$$\theta_0 = \theta/5 + 72N \qquad (1)$$

where N is any of integers from 0 to 4.

Hereinafter, all angles are represented by electric angles as long as without a special explanation.

The forced driving section 15 is to conduct the forced driving of the second operation mode after the first operation mode, as previously mentioned. The forced driving section 15 sets the A-phase current command and the B-phase current command with respect to the A-phase current driver 22 and the B-phase current driver 23 according to a rotation angle $\Theta$ of the rotor 29 in the first operation mode, which is informed from the control section 11.

An angle position detecting section 14 detects an phase current command and a B-phase current command flowing to the A-phase stator 26 and the B-phase stator 27 in the first operation mode, determines whether each of the currents is positive or negative, obtains the ratio between the currents, obtains the rotation angle $\Theta$ of the rotor 29 by referring to a rotation angle data table 61 shown in FIG. 2 incorporated in the angle position detecting section 14, and informs the rotation angle $\Theta$ to the control section 11.

In the rotation angle data table 61, and data tables 62, 63, and 64, which will be described later, a rotation angle is 0° when only the A-phase stator 26 is excited in the positive direction, and represented by an electric angle in which a clockwise direction is the positive direction.

In the rotation angle data table 61, four sections corresponding to positive and negative of the A-phase current and positive and negative of the B-phase current of the A-phase stator 26 are provided, and a rotation angle $\Theta$ corresponding to a current ratio between the A-phase current and the B-phase current is set in each of the sections.

For example, when both the A-phase current and the B-phase current are positive, and a current ratio between the A-phase current and the B-phase current is "1", the rotation angle $\Theta$ is 45°.

Such a relationship of the rotation angle $\Theta$ to the current ratio is inherent to the stepping motor. Thus, when a structure of the stepping motor is changed, contents of the rotation angle data table 61 are required to be changed. Furthermore, when characteristics of the stepping motor vary due to errors in fabrication or the like, though the structure of the stepping motor is the same, it is required that contents of the data table be measured and set for every stepping motor.

The control section 11 informs the direction of rotation of the rotor 29 (clockwise or counterclockwise) corresponding to the rotation angle $\Theta$ of the rotor 29 in the first operation mode and the direction of movement of the optical head 54 to the forced driving section 15. The forced driving section 15 refers to the first data table 62, shown in FIG. 3, which is incorporated in the forced driving section 15, reads an A-phase current command and a B-phase current command corresponding to the rotation angle $\Theta$ of the rotor 29, and the current commands are applied to the A-phase current driver 22 and the B-phase current driver 23.

In the first data table 62, four rotation angle ranges are set for each of the clockwise direction and the counterclockwise direction of the rotor 29, and the A-phase current command and the B-phase current command are set for each rotation angle range. Therefore, eight pairs of the A-phase current command and the B-phase current command are set.

For example, when the rotation angle $\Theta$ of the rotor 29 is in the range of $0° \leq \Theta < 90°$ by the microstep driving in the first operation mode, and the rotor 29 is rotated clockwise by the forced driving in the second operation mode, commands for "exciting the A-phase in the negative direction, and the B-phase is excited in the positive direction", i.e., an A-phase command for exciting the A-phase stator 26 in the negative direction, and a B-phase command for exciting the B-phase stator 27 in the negative direction are selected. When an A-phase current and a B-phase current represented by the A-phase current command and the B-phase current command are provided to the A-phase stator 26 and the B-phase stator 27, a great rotation torque occurs in the clockwise direction in the rotor 29, thereby starting the high-speed operation from the rotation angle $\Theta$.

That is, in the second operation mode, for each magnetic pole of the rotor 29 of the rotation angle $\Theta$ in the first operation mode, a magnetic power of the A-phase stator 26 and the B-phase stator 27, which are appropriately excited by the A-phase current and the B-phase current, effects so as to cause the rotor 29 to generate a great rotation torque in a predetermined direction, thereby starting the high-speed operation of the rotor 29. Herein, the A-phase current command and the B-phase current command for further rotating the rotor 29 to a rotation angle, which is advanced by 45°–135° with respect to the rotation angle in the first operation angle, are selected from the first data table 62. Thus, in spite of the rotation angle of the rotor 29 to before it starts to rotate, the rotor 29 can be started with substantially maximum torque while avoiding a dead point.

The operation pattern generating section 13 is to conduct the third operation mode after the second operation mode, thereby continuing the high-speed operation of the stepping motor 25.

The control section 11 refers to a switch timing data table 63 shown in FIG. 4, which is incorporated in the control section 11, and sets a timing to switch from the second operation mode to the third operation mode.

In the switch timing data table 63, enumerated values corresponding to four rotation angle ranges are set for the clockwise direction and the counterclockwise direction. These rotation angle ranges are obtained in a manner that the rotation angle of 360° is divided into sixteen small rotation angle ranges of 22.5°, and these small rotation angle ranges are grouped into four groups including four small rotation angle ranges which are offset with each other by 90°.

For example, a rotation angle range, "0°+n× 90°≤$\Theta$<22.5°+n×90°, n=0–3", includes four small rotation angle ranges, 0°–22.5°, 90°–112.5°, 180°–202.5°, 270°–292.5°.

The control section 11 refers to the switch timing data table 63, and selects the direction of rotation of the rotor 29 in the second operation mode and an enumerated value corresponding to the rotation angle $\Theta$ of the rotor 29 in the first mode. The control section 11 controls the forced driving section 15, thereby starting the second operation mode. When the second operation mode is started, the rotor 29 rotates, whereby a pulse signal is output from the comparator 34. The control section 11 starts counting the pulse signals from the comparator 34 and, when this enumerated value reaches the enumerated value selected from the switch timing data table 63, directs the driving pattern generating portion 13 to start the third operation mode.

For example, when a rotation direction of the rotor 29 in the second operation mode is clockwise, and the rotation angle Θ of the rotor 29 in the first operation mode is in a rotation angle range, "0°+n×90°≦Θ<22.5°+n×90°, n=0–3", an enumerated value 4 is selected from the switch timing data table 63, the rotor 29 is rotated by the forced driving in the second operation mode: and, when the enumerated value of the pulse signal reaches "4", the third operation mode is started. Alternatively, when the rotation angle Θ of the rotor 29 in the first operation mode is in a rotation angle range, "22.5°+n×90°≦Θ<45°+n×90°, n=0–3", an enumerated value 3 is selected from the switch timing data table 63, the rotor 29 is rotated by the forced driving in the second operation mode; and, when the enumerated value of the pulse signal reaches "3", the third operation mode is started.

As a result, when switching from the second operation mode to the third operation mode, the rotation angle of the rotor 29 is specified as any of 0°, 90°, 180°, 270°, and 360°.

Furthermore, the driving pattern generating section 13 is informed of the rotation angle Θ of the rotor 29 in the first operation mode and a rotation direction of the rotor 29 in the second operation mode from the control section 11. The driving pattern generating section 13 refers to the second data table 64 shown in FIG. 5, which is incorporated in the driving pattern generating section 13, and reads the A-phase current command and the B-phase current command from the second data table 64, and applies the current commands to the A-phase current driver 22 and the B-phase current driver 23.

In the second data table 64, four rotation angle ranges are set for the clockwise direction and the counterclockwise direction of the rotor 29. For each of these rotation angle ranges, the following are set: an A-phase current command and a B-phase current command just after the switching from the second operation mode to the third operation mode (at a point in time when the third operation mode starts); an A-phase current command and a B-phase current command when a third pulse signal from the comparator 34 is input after the switching; an A-phase current command and a B-phase current command when a seventh pulse signal is input from the comparator 34; an A-phase current command and a B-phase current command when an eleventh-pulse signal is input; and, an A-phase current command and a B-phase current command when a fifteenth pulse signal is input.

For example, in the case where the rotation angle Θ of the rotor 29 in the first operation mode is in the range of 0°≦Θ<90°, and the rotor 29 is rotated clockwise by the forced driving in the second operation mode, an A-phase current command for exciting the A-phase stator 26 in the negative direction and a B-phase current command for exciting the B-phase stator 27 in the negative direction just after the switching from the second operation mode to the third operation mode (at a point in time when the third operation mode starts) are selected; when the third pulse signal is input from the comparator 34, an A-phase current command for exciting the A-phase stator 26 in the positive direction and a B-phase current command for exciting the B-phase stator 27 in the negative direction are selected; when the seventh pulse is input, when the eleventh pulse is input, and when the fifteenth pulse is input, an A-phase current command and a B-phase current command for each case are selected; and subsequently, when the four pulse signals are further input, they return to the A-phase current command and the B-phase current command when the third pulse signal was input. Thereafter, every time four pulse signals are input, the A-phase current commands and the B-phase current commands when the seventh, eleventh, fifteenth, and third pulse signals were input are sequentially selected.

That is, in the third operation mode, in order to continue the rotation from the rotation angle Θ of the rotor 29 in the first operation mode after the rotation of the rotor 29 has started by the forced driving in the second operation mode, a rotation angle where the third operation mode starts is detected, and after passing this point of rotation angle, the A-phase current command and the B-phase current command are changed at a certain rotation angle period.

The driving pattern generating section 13 includes a programmable counter and the like, in which a frequency of a pulse signal from the comparator 34 is divided and counted, and the third, seventh, eleventh, and fifteenth pulse signals in the second data table 64 are detected by changing the ratio of the divided frequency. That is, at the point in time when the third operation mode starts, when three pulse signals from the comparator 34 are input to a programmable counter, the programmable counter detects an input of the three pulse signals by counting up. Thereafter, the programmable counter, every time four pulse signals from the comparator 34 are input to it, detects an input of the seventh, eleventh, and fifteenth pulse signals, etc., by counting up.

In this manner, the microstep driving in the first operation mode by the microstep driving section 16, the forced driving in the second operation mode by the forced driving section 15, and the high-speed driving in the third operation mode by the driving pattern generating section 13 are continuously conducted. The control section 11 controls the command selector 12, thereby selecting an A-phase current command and a B-phase current command output from any of the microstep driving section 16, the forced driving section 15, and the driving pattern generating section 13 to apply them to the driving section 21. A timing of the switching from the first operation mode to the second operation mode, i.e., a timing of the switching from an output of the microstep driving section 16 to an output of the forced driving section 15, is appropriately determined by the control section 11. For example, the timing is set at the point in time when the optical head 54 starts moving. At this timing, the control section 11 directs the command selector 12 to switch from the microstep driving section 16 to the forced driving section 15, thereby starting the forced driving section 15. Furthermore, a timing of the switch from the second operation mode to the third operation mode, i.e., a timing of the switching from an output of the forced driving section 15 to an output of the driving pattern generating section 13, is the point in time when the third operation mode starts as previously described. At this starting point in time, the control section 11 directs the command selector 12 to switch from the forced driving section 15 to the driving pattern generating section 13, thereby starting the driving pattern generating section 13.

Next, a series of operations of a stepping motor having such a structure will again be briefly described.

When the stepping motor 25 is attempted to be rotated by a certain rotation angle or more, the control section 11 first determines a rotation direction of the stepping motor 25. Herein, the rotation direction is clockwise rotation. In this case, the first operation mode is selected, and an A-phase current command and a B-phase current command are output from the microstep driving section 16 to an A-phase current driver 22 and a B-phase current driver 23 through the command selector 12. In the usual case, the stepping motor 25 of the rotor 29 is in the stationary state at any rotation angle $\Theta$.

Next, the control section 11 informs the forced driving section 15 of a rotation angle $\Theta$ of the rotor 29 in the first operation state and a rotation direction of the rotor 29 corresponding to a moving direction of the optical head 54. Furthermore, the control section 11 controls the command selector 12 to connect the forced driving section 15 to the A-phase current driver 22 and the B-phase current driver 23. The forced driving section 15 refers to the first data table 62, and reads an A-phase current command and a B-phase current command corresponding to the rotation angle $\Theta$ in the first operation mode. The current commands are applied to the A-phase current driver 22 and the B-phase current driver 23, thereby starting the rotation of the stepping motor 25.

Next, the control section 11 refers to the switch timing data table 63, and sets a timing to switch from the second operation mode to the third operation mode. At this timing, the control section 11 controls the command selector 12 to connect the driving pattern generating section 13 to the A-phase current driver 22 and the B-phase current driver 23. The driving pattern generating section 13 refers to the second data table 64, and repeatedly retrieves the A-phase current command and the B-phase current command from the second data table 64, and sequentially applies the A-phase current command and the B-phase current command to the A-phase current driver 22 and the B-phase current driver 23. This continues the rotation of the stepping motor 25.

In the present embodiment, the rotation angle of the rotor 29 before the stepping motor 25 starts to rotate is detected by the angle position detection section 14. Furthermore, the rotation angle after the rotation has started is detected by counting a pulse signal output from the comparator 34 with a resolution of 4.5° (an electric angle of 22.5°). Therefore, both when the stepping motor 25 is in pause and when in rotation, the rotation angle can be precisely detected, whereby the control of the rotation angle of the stepping motor 25 shifting from pause state to rotation state can be precisely conducted. For example, the A-phase current command and the B-phase current command at a point in time when the third operation mode starts, which are commands for rotating the rotor 29 to a position which has advanced in the rotation direction by 90° with respect to the A-phase current command and the B-phase current command in the second operation mode, are set, as is the case with the common two-phase excitation pattern. A switching from the second operation mode to the third operation mode is conducted at a timing when the rotation angle of the rotor 29 of the stepping motor 25 reaches an advancing angle $\Psi$ which is present just before said position. Thereafter, every time the rotor 29 of the stepping motor 25 further progresses by a rotation angle of 90°, the A-phase current command and the B-phase current command are updated with an A-phase current command and a B-phase current command for causing the rotor 29 to rotate to a position to which the rotor 29 has advanced by the rotation angle of 90°, thereby driving the rotor 29 consistently in advance by a substantially constant advancing angle $\Psi$.

Figure 6:
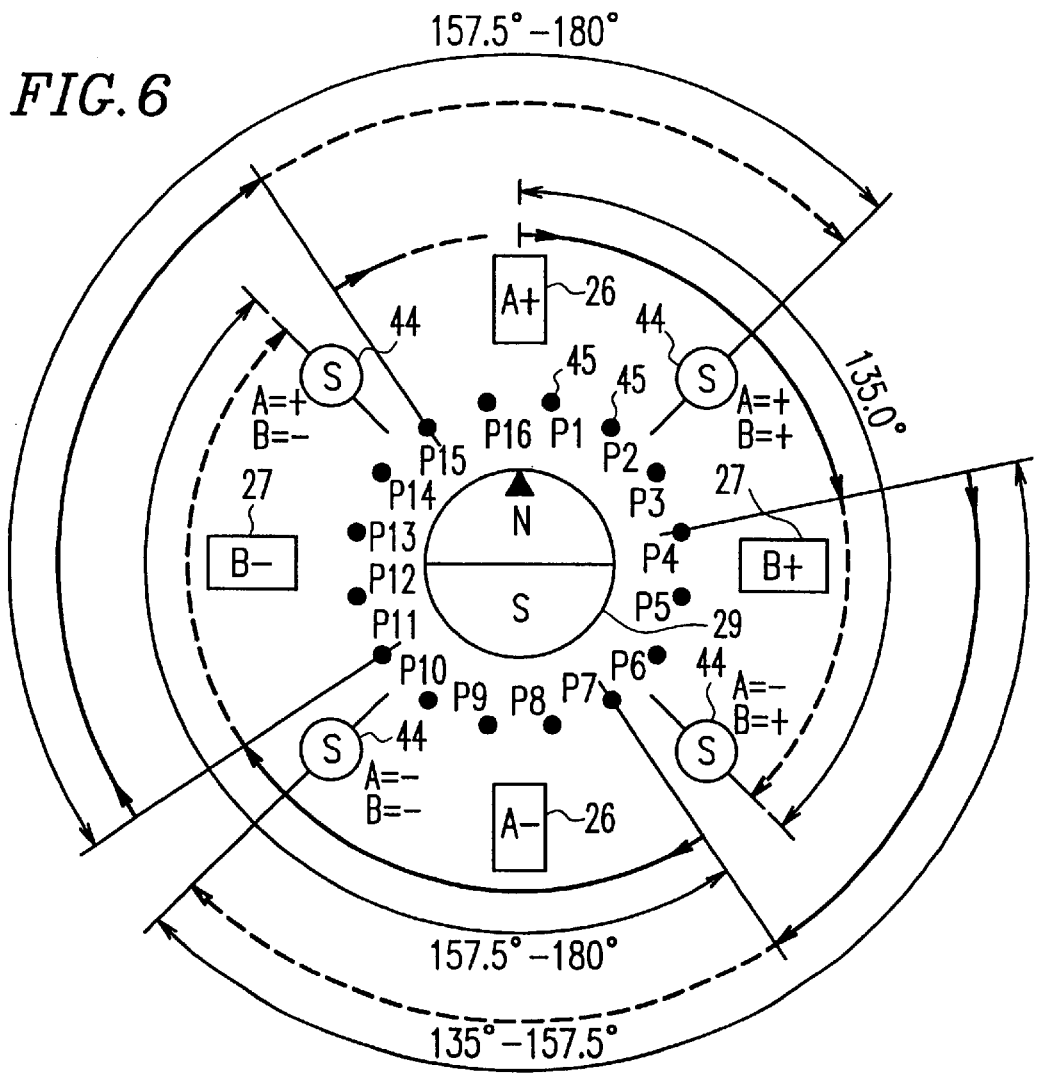
FIG. 6 is a simplified diagram showing a structure of the stepping motor of FIG. 1.
Figure 7:
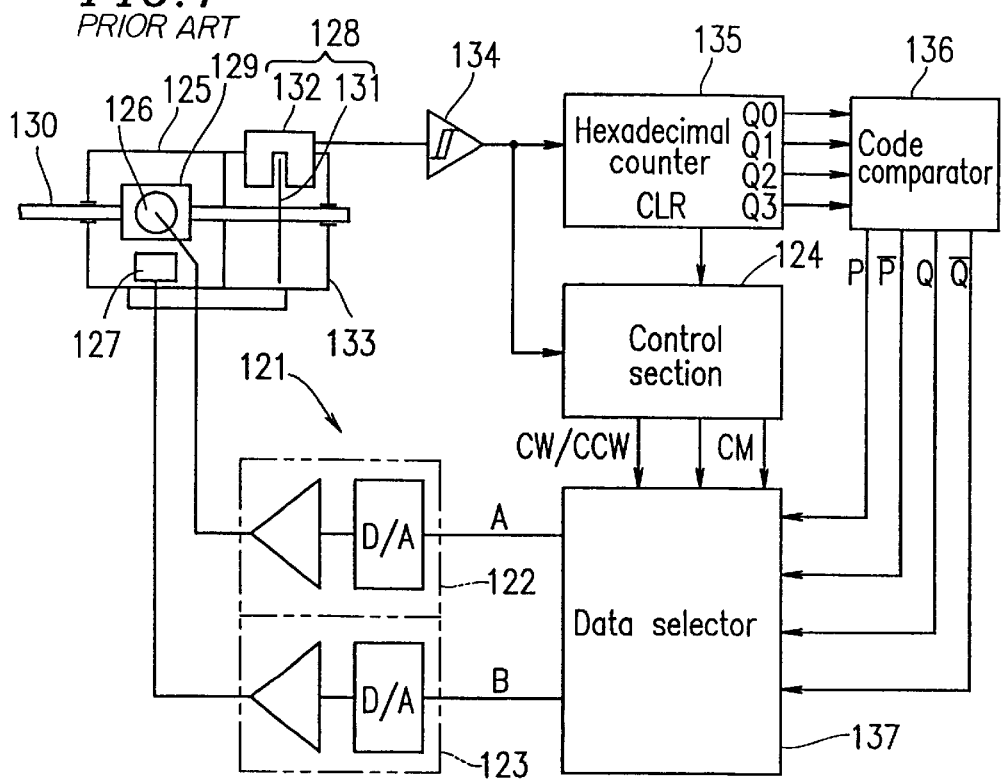
FIG. 7 is a control device of the conventional stepping motor.

A driving method of the rotor 29, which is advanced by the advancing angle $\Psi$ in such a manner, will be described with reference to FIG. 6. In FIG. 6, for simplifying the description, a rotor 29 including only one pair of an N-pole and an S-pole formed thereon (in fact, five pairs of an N-pole and an S-pole are formed on the rotor 29) is shown, in which the rotor 29 is rotated by an electric angle of 360° (corresponding to actual rotation angle of 72°). Furthermore, reference numeral 44 represents a virtual S-pole, and reference numeral 45 represents a generation position of a pulse signal.

For example, when the A-phase stator 26 is excited in the positive direction, and the B-phase stator 27 is excited in the positive direction, the virtual S-pole 44 composed of magnetic fields occurs at a position A=+, B=+. When the A-phase stator 26 and the B-phase stator 27 are excited so as to result in other states, the virtual S-pole 44 composed of magnetic fields occurs at respective positions in like manner.

Herein, the N-pole of the rotor 29 is present at a position at which the rotation angle $\Theta$ is 0°. In this case, a command by the forced driving in the second operation mode, according to the first data table 62, is an A-phase current command for exciting the A-phase stator 26 in the negative direction and a B-phase current command for exciting the B-phase stator 27 in the positive direction. In this case, the virtual S-pole 44 occurs at a position A=−, B=+, and the advancing angle $\Psi$ becomes 135°, whereby the rotation of the rotor 29 is started.

In response to the rotation of the rotor 29, a pulse signal is output from the comparator 34. At a point in time when four pulse signals P1–P4 are counted according to the switch timing data table 63, the operation mode transfers from the second operation mode to the third operation mode. Command values are an A-phase current command for exciting the A-phase stator 26 in the negative direction and a B-phase current command for exciting the B-phase stator 27 in the negative direction. In this case, the virtual S-pole 44 occurs at a position A=−, B=−, the position advances by 90° with respect to a position of the second operation mode, and the advancing angle $\Psi$ becomes 135°–157.5°, whereby the rotation of the rotor 29 is started. The advancing angle $\Psi$ is in the range between 135° and 157.5° because the positional relationship between the slit disc 31 and the photosensor 32 is not adjusted. Thus, a phase of a pulse signal output form the comparator 34 varies in the range of an angle of 22.5°. Such a level of variation does not significantly affect characteristics of the stepping motor 25.

In the third operation mode, the rotor 29 further rotates to output a pulse signal from the comparator 34. A first switching of phases are conducted at a point in time when three pulse signals P5–P7 are counted according to the second data table 64, commands become an A-phase current command for exciting the A-phase stator 26 in the positive direction and a B-phase current command for exciting the B-phase stator 27 in the negative direction. In this case, the virtual S-pole 44 occurs at a position A=+, B=−, the position advances by 90° with respect to the virtual S-pole 44 at a point in time when the third operation mode starts. On the other hand, at this point in time, the rotor 29 advances by an angle corresponding to each of the three pulse signals P5–P7, i.e., 67.5°, with respect to a position at a point in time when the third operation mode starts. Thus, an advancing angle $\Psi$ at this point in time is larger by 22.5° than the advancing angle $\Psi$ at a point in time when the third operation mode starts, resulting in the advancing angle $\Psi$ in the range between 157.5° and 180°. This is to compensate for an effect of a delay of current due to inductance components of the stator coil when the velocity of its rotation is fast. As a result, the rotor 29 is further rotated to output a pulse signal from the comparator 34.

Furthermore, a second switching of phases is conducted at a point in time when four pulse signals P8–P11 are counted according to the second data table 64, and commands become an A-phase current command for exciting the A-phase stator 26 in the positive direction and a B-phase current command for exciting the B-phase stator 27 in the negative direction. In this case, the virtual S-pole 44 occurs at a position A=+, B=+, the position advances by 90° with respect to the virtual S-pole 44 at a point in time of the first switching of phases in the third operation mode. On the other hand, at this point in time, the rotor 29 advances by an angle corresponding to each of the four pulse signals P8–P11, i.e., 90°, with respect to a position at a point in time when the third operation mode starts. Thus, the advancing angle Ψ remains the same, resulting in the advancing angle Ψ in the range between 157.5° and 180°.

Thereafter, the virtual S-pole 44 advances by 90° every four pulse signals in like manner; therefore, the advancing angle Ψ constantly remains in the range between 157.5° and 180°.

Furthermore, in the case where the rotor 29 is rotated from a rotation angle Θ=45° in the clockwise direction, as in the case of the rotation from a rotation angle Θ=0°, commands of the forced driving in the second operation mode, according to the first data table 62, become an A-phase current command for exciting the A-phase stator 26 in the negative direction and a B-phase current command for exciting the B-phase stator 27 in the positive direction. In this case, the virtual S-pole 44 occurs at a position A=−, B=+, and the advancing angle Ψ becomes 90°, whereby the rotation of the rotor 29 is started. In response to the rotation of the rotor 29, a pulse signal is output from the comparator 34. At a point in time when two pulse signals P3 and P4 are counted according to the switch timing data table 63, the operation mode transfers from the second operation mode to the third operation mode. At this time, the rotation position of the rotor 29 is present at the same position as in the case of the rotation from a rotation angle Θ=0°. Thus, the subsequent driving procedure is exactly the same as that in the case of the rotation from the rotation angle Θ=0°.

In the present embodiment, the forced driving section 15 for conducting the second driving mode and the driving pattern generating section 13 for conducting the third driving mode are separately provided. However, they may be integrated because they are the same in that both output a command according to outputs from the comparator 34 and the angle position detection section 14. Alternatively, instead of providing the angle position detection section 14, a target rotation angle which is set in the control section 11 may be used. That is, a target value of the rotor 29 is set in the control section 11. This target rotation angle is applied to the microstep driving section 16. The stepping motor 25 is controlled by the microstep driving section 16 to rotate the rotor 29 to the target rotation angle. The rotation angle of the rotor 29 is detected by the angle position detecting section 14, whereby the rotation angle of the rotor 29 can be detected in the control section 11 without specially providing the angle position detection section 14. Alternatively, functions corresponding to data tables 61, 62, 63, and 64, respectively, may be set in advance, and control parameters may be obtained on the basis of these functions, respectively.

INDUSTRIAL APPLICABILITY

According to the present invention, as described above, a rotor can be started from any rotation angle, whereby it is not necessary to rotate the rotor to a rotation angle by the one-phase excitation. Thus, no extra time is required for this rotation.

Furthermore, it is not necessary to hold at the rotation angle of the rotor by the one-phase excitation and to be on standby until a vibration of the rotor decreases as in the conventional manner. Thus, when a stepping motor of the present invention is employed for a general CD-ROM apparatus or the like in order to transport an optical head in a radial direction of a disk (to seek), 10–20 ms, which corresponds to the conventional standby period, can be eliminated.

Furthermore, a vibration of the rotor does not occur as in the conventional device. Thus, when the stepping motor of the present invention is employed for a CD-ROM device or the like, a focus servo of an optical head is not adversely affected.

Furthermore, in the present invention, an advancing angle Ψ is changed to an optimum value according to the velocity of rotations of the stepping motor, whereby the stepping motor can be stably operated from the low-speed rotation to the high-speed rotation. Thus, in the optical disk device employing the stepping motor, the seek period or the like can be significantly reduced.

What is claimed is:

1. A control device for a stepping motor, comprising:
   a stepping motor including a rotor in which a magnetic pole is formed for a certain angle along a circumferential direction, and an exciting coil of multiple phases;
   rotation angle detection means for detecting a rotation angle of the rotor;
   driving current setting means for setting each driving current of the exciting coil according to each rotation angle of the rotor; and
   control means for obtaining a driving current of the exciting coil corresponding to the rotation angle of the rotor detected by the rotation angle detection means by the driving current setting means in a microstep driving state for controlling the rotation angle of the rotor, and applying the driving current to the exciting coil, thereby shifting the rotor to a rotation driving state of the rotor.

2. A control device for a stepping motor according to claim 1, wherein:
   the driving current setting means has a first data table in which each driving current of the exciting coil is stored according to each rotation angle of the rotor in the microstep driving state, and a second data table in which each driving current of the exciting coil is stored according to each rotation angle of the rotor in the rotation driving state; and
   the control means obtains a driving current corresponding to the rotation angle of the rotor detected by the rotation angle detection means in the microstep driving state from the first data table and applies the driving current to the exciting coil, thereby starting a driving of the rotation of the rotor, and thereafter, the control means obtains a driving current corresponding to the rotation angle of the rotor, which is to be applied to the exciting coil and has been detected by the rotation angle detection means, from the second data table and applies the driving current to the exciting coil, thereby continuing the rotation.

3. A control device for a stepping motor according to claim 2, wherein:
   the rotation angle detection means includes a first rotation angle detection means for detecting the rotation angle of the rotor according to the driving current of the exciting coil, and a second rotation angle detection means composed of an encoder connected to the rotor;

the rotation angle of the rotor detected by the first rotation angle detection means is used for obtaining a driving current of the exciting coil from the first data table; and the rotation angle of the rotor detected by the second rotation angle detection means is used for obtaining a driving current of the exciting coil from the second data table.

4. A control device for a stepping motor according to claim 3, wherein:

the control means sets the rotation angle of the rotor from a rotation start point in time of the rotor at which the driving current obtained from the first data table is applied to the exciting coil to a point in time at which the driving current obtained from the second data table starts to be applied to the exciting coil; and the set rotation angle of the rotor is detected by the second rotation angle detection means.

5. A control device for a stepping motor according to claim 3, wherein the first rotation angle detection means has a rotation angle data table in which the rotation angle of the rotor corresponding to the driving current of the exciting coil is stored.

6. A control device for a stepping motor, comprising:

a stepping motor including a rotor in which a magnetic pole is formed for a certain angle along circumferential direction, and an exciting coil of multiple phases;

rotation angle detection means for outputting a periodic signal every time the rotor rotates by a predetermined angle;

driving current setting means for setting each driving current of the exciting coil for each divided frequency;

control means for dividing the periodic signal from the rotation angle detection means to obtain a divided frequency, the driving current is obtained from a second data table at every divided frequency, and applying the driving current to the exciting coil so as to drive and rotate the rotor, whereby a dividing ratio of the periodic signal is changed according to a rotation speed of the rotor.

7. A driving device for an optical head, which drives an optical head for recording in or reproducing from a recording medium by a stepping motor including a rotor in which magnetic poles are formed for a certain angle along circumferential direction, and an exciting coil of multiple phases, the driving device comprising:

a control device for driving and controlling the stepping motor, wherein the control device includes rotation angle detecting means for detecting a rotation angle of the rotor, driving current setting means for setting each driving current of the excitation coil according to each of the rotation angles of the rotor, control means for obtaining the driving current of the excitation coil corresponding to the rotation angle of the rotor detected by the rotation angle detecting means in a microstep driving state in which the rotation angle of the rotor is controlled by the driving current setting means, and applying the driving current to the excitation coil, thereby shifting the rotor to a rotation driving state of the rotor.

* * * * *